United States Patent
Arnault et al.

(10) Patent No.: US 9,062,759 B2
(45) Date of Patent: Jun. 23, 2015

(54) PULLEY DEVICE WITH A DAMPING ELEMENT

(75) Inventors: Benoit Arnault, Saint-Cyr-sur-Loire (FR); Nicolas Berruet, Artannes sur indre (FR); Michel Bonnet, Tours (FR); Richard Corbett, Fondettes (FR); Samuel Viault, Saint Antoine du Rocher (FR)

(73) Assignee: AKTIEBOLAGET SKF, Gothenburg (SE)

( * ) Notice: Subject to any disclaimer, the term of this patent is extended or adjusted under 35 U.S.C. 154(b) by 219 days.

(21) Appl. No.: 13/593,576

(22) Filed: Aug. 24, 2012

(65) Prior Publication Data
US 2013/0225344 A1 Aug. 29, 2013

(30) Foreign Application Priority Data
Aug. 26, 2011 (EP) ..................................... 11306070

(51) Int. Cl.
F16H 15/36 (2006.01)
F16H 55/36 (2006.01)

(52) U.S. Cl.
CPC .......... *F16H 55/36* (2013.01); *F16H 2055/366* (2013.01)

(58) Field of Classification Search
CPC ........................... F16H 2055/366; F16H 55/36
USPC .......................................... 474/94, 161, 166
See application file for complete search history.

(56) References Cited

U.S. PATENT DOCUMENTS

| | | | | |
|---|---|---|---|---|
| 5,564,981 A | * | 10/1996 | Iwabuchi et al. | 464/73 |
| D481,615 S | * | 11/2003 | Hodjat et al. | D8/360 |
| 7,244,185 B2 | * | 7/2007 | Kamdem et al. | 464/75 |
| 2007/0179000 A1 | * | 8/2007 | Damson et al. | 474/94 |
| 2009/0258741 A1 | * | 10/2009 | Nosaka et al. | 474/178 |
| 2009/0318252 A1 | * | 12/2009 | Riu | 474/94 |
| 2010/0259121 A1 | * | 10/2010 | Ueda et al. | 310/103 |

FOREIGN PATENT DOCUMENTS

| | | | | |
|---|---|---|---|---|
| EP | 0793031 B | * | 2/1997 | ............... F16D 7/00 |
| EP | 1764524 A1 | | 3/2007 | |
| FR | 2790521 A1 | | 9/2000 | |
| JP | 2009103161 A | * | 5/2009 | ............. F16H 55/36 |
| WO | WO2009054170 A1 | | 4/2009 | |

OTHER PUBLICATIONS

Machine translation of JP-2009/103161.*

* cited by examiner

*Primary Examiner* — William E Dondero
*Assistant Examiner* — Robert T Reese
(74) *Attorney, Agent, or Firm* — Bryan Peckjian; SKF USA Inc. Patent Dept.

(57) ABSTRACT

Pulley device for a rotary machine, and in particular a compressor, comprising a pulley, a rolling bearing, a torque transmission plate having an axial sleeve designed to be mounted on a rotary spindle of the rotary machine and a radial plate extending radially from the axial sleeve and having the general shape of a disc, said pulley being mounted on an outer ring of the rolling bearing and on the torque transmission plate, the torque transmission plate being able to transmit a rotational movement from the pulley to the rotary spindle.
Said pulley device comprises a damping element located between the pulley and the torque transmission plate.

10 Claims, 3 Drawing Sheets

PULLEY DEVICE WITH A DAMPING ELEMENT

CROSS-REFERENCE TO RELATED APPLICATION

This United States Non-Provisional Utility application claims the benefit of copending European Patent Application Serial No. EP11306070, filed on Aug. 26, 2011, which is incorporated herein in its entirety.

FIELD OF THE INVENTION

The present invention relates to the field of torque transmission devices used in particular in belt-driven rotary machines, for example motor vehicle air conditioning compressors.

BACKGROUND OF THE INVENTION

In such compressor drive devices, a belt-driven pulley drives the transmission spindle of the compressor via a torque transmission plate. The pulley is mounted on the outer ring of a rolling bearing, the inner ring of which is secured to a hollow shaft of the compressor housing. This type of device is described particularly in document FR 2 790 521.

However, since the belt-driven pulley is driven by an internal combustion engine of the motor vehicle, acyclisms resulting of the alternation between decompression and combustion phases are transmitted to the pulley, and to the transmission spindle of the compressor. Furthermore, vibrations of the rotation of the compressor's spindle can also be transmitted to the pulley.

One aim of the present invention is therefore to overcome the aforementioned drawbacks.

SUMMARY OF THE INVENTION

It is a particular object of the present invention to provide a pulley device comprising means for filtering any vibrations from the pulley to the rotary spindle, and from the rotary spindle to the pulley.

In one embodiment, a pulley device for a rotary machine, especially a compressor, comprises a pulley, a rolling bearing, a torque transmission plate having an axial sleeve designed to be mounted on a rotary spindle of the rotary machine and a radial plate extending radially from the axial sleeve and having the general shape of a disc. Said pulley is mounted on an outer ring of the rolling bearing and on the torque transmission plate, the torque transmission shaft being able to transmit a rotational movement from the pulley to the rotary spindle.

The pulley device comprises a damping element placed between the pulley and the torque transmission plate.

Such a damping element improves the service life of the belt and the pulley by damping the vibrations between the pulley and the rotary spindle.

Advantageously, the damping element is overmoulded onto the pulley and onto the torque transmission plate.

The radial plate of the torque transmission plate may comprise a first series of slotted holes made through the plate forming annular portions centred on one and the same circle, angularly equidistant and tangential to the outer surface of the radial plate. Such slotted holes, are drilled through the thickness of the radial plate so as to cooperate with a fitting tool, for example a crimping tool for axially fitting the rolling bearing and the pulley onto a hollow shaft of the housing.

The radial plate of the torque transmission plate may comprise a second series of slotted holes made through the plate forming annular portions centred on one and the same circle, angularly equidistant and located between the first series of slotted holes and the axial sleeve.

For example, the second slotted holes are uniformly spaced on a circle so that the bridges of the plate that remain between said second series of slotted holes define a region of lower strength liable to rupture if the torque transmission plate transmits a torque exceeding a threshold value.

Advantageously, the radial plate comprises through-holes adapted to cooperate with the damping element.

In order to transmit high torque, the damping element may comprise, on its periphery, a series of dovetails adapted to cooperate with recesses of complementary shape on the pulley. Said dovetails are, for example, of trapezoidal shape.

The damping element is made of elastomeric material, such as rubber material, polyurethane . . .

The torque transmission plate is advantageously made of a stamped metal sheet.

In one embodiment, the pulley device comprises a bearing shield between the outer ring of the rolling bearing and the inner surface of the pulley, so as to prevent the pulley to be overmoulded directly on the outer ring of the rolling bearing.

According to another aspect, it is proposed a rotary machine comprising a static hollow shaft, a rotary spindle, and a pulley device described above.

BRIEF DESCRIPTION OF THE DRAWINGS

The present invention will be better understood with the aid of the detailed description of a number of embodiments given by way of non-limiting examples and illustrated by the attached drawings, in which.

DETAILED DESCRIPTION OF THE INVENTION

Figure 1:
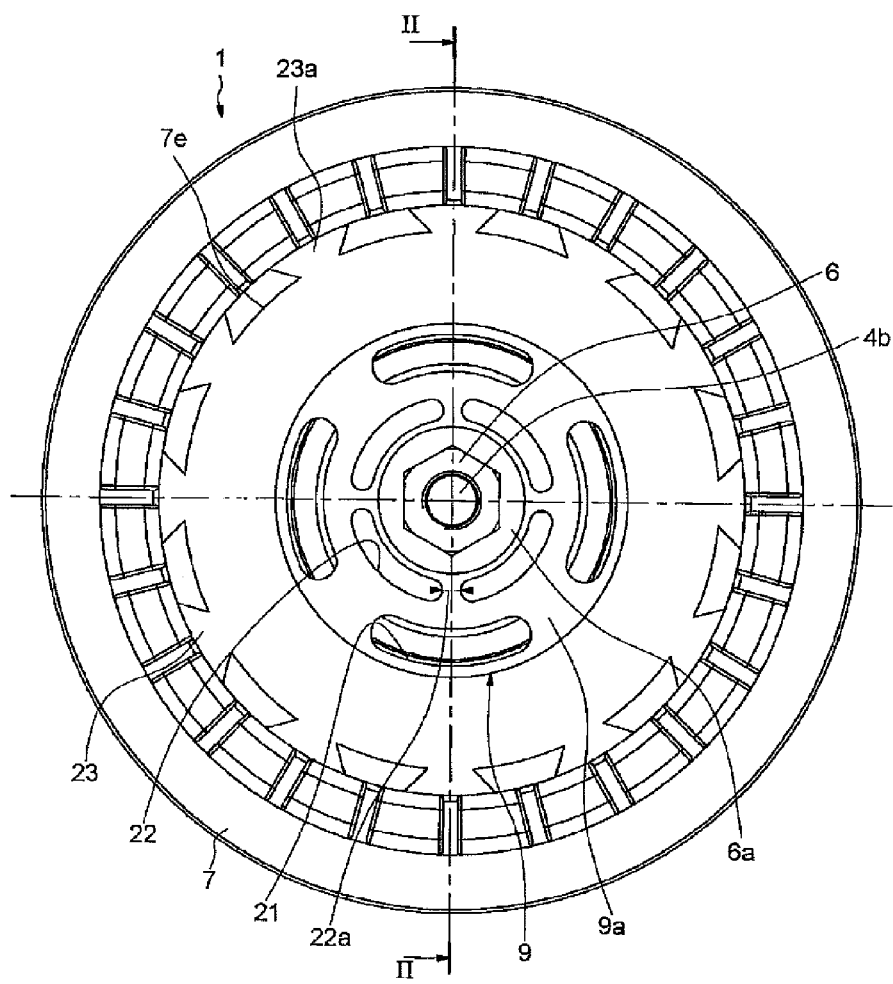
FIG. 1 is a front view of a pulley device according to the invention, mounted on a compressor.
Figure 2:
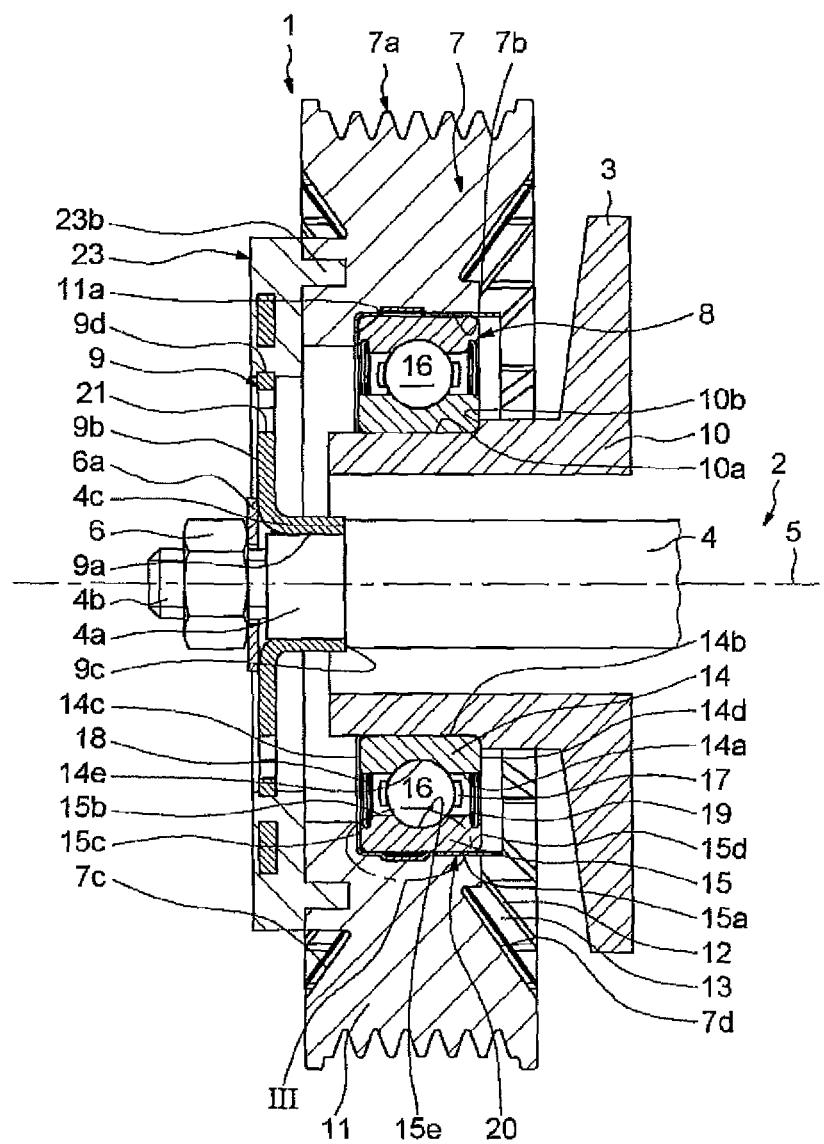
FIG. 2 is an axial section, along line II-II of FIG. 1.

As illustrated on FIGS. 1 and 2, a pulley device, designed by general reference number 1, is designed to be mounted on a compressor 2 comprising a housing or casing 3 that does not rotate, and a transmission spindle 4 capable of rotating about an axis 5. The transmission spindle 4 may be provided with a stepped end 4a ending in a threaded portion 4b so that it can interact with a nut 6. The stepped end 4a, of a smaller cross section than the cross section of the spindle 4, is delimited by a shoulder 4b. The transmission spindle 4 passes through a hollow shaft 10 of the housing 3, coaxial with the transmission spindle 4.

The pulley device 1 comprises a pulley 7, a rolling bearing 8 and a torque transmission plate 9. The pulley 7 has an outer surface 7a designed to cooperate with a belt (not illustrated), a bore 7b, and two lateral radial surfaces 7c and 7d, the surface 7d being arranged facing the casing 3, and the surface 7c being arranged on the opposite side to the casing 3. The outer surface 7a may have annular ribs to cooperate with a belt of the poly-V type for example. The pulley 7 may be made of resin, for example based on polyamide, phenolic resin or alternatively polyurethane, or light alloy.

The pulley 7 may comprise a solid annular portion 11 and a plurality of stiffening ribs 12. As illustrated on the Figures, the ribs 12 are not symmetric with respect to a radial plane perpendicular to the axis 5. A plurality of housings 13 are formed in the lateral surface 7c of the pulley 7. The housings 13 may be spaces between two ribs 12 or encroaching on the ribs 12.

The rolling bearing 8 comprises an inner ring 14, an outer ring 15, at least one row of rolling elements 16, a cage 17 to maintain uniform circumferential spacing of the rolling elements 16 and two seals 18 and 19. The inner ring 14 comprises an outer surface 14a of revolution, a bore 14b in contact with an axial surface 10a of the hollow shaft 10 of the casing 3, and two lateral radial surfaces 14c and 14d, the lateral surface 14d being in contact with a radial surface 10b of the shaft 10, for example a shoulder. A raceway 14e of toroidal shape is formed by machining from the outer surface 14a.

The outer ring 15 comprises an outer surface 15a, a bore 15b and two transverse radial surfaces 15c and 15d respectively aligned with the radial surfaces 14c and 14d. The lateral surface 15c being in contact with a radial surface 11a of the bore 7b of the pulley, for example a shoulder. A raceway 15e is created by machining from the bore 15b. The raceway 15e is of toroidal shape.

The rolling elements 16, for example balls, are positioned between the raceways 14e and 15e of the inner 14 and outer 15 rings.

Figure 3:
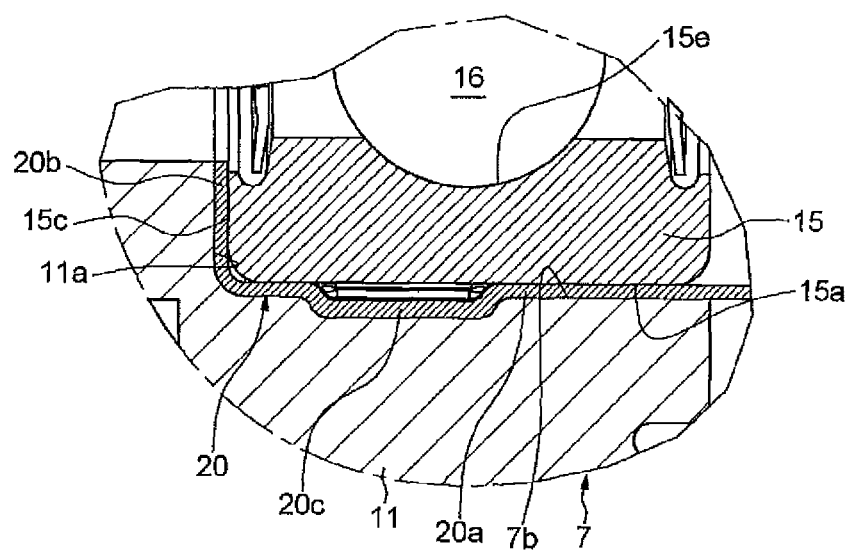
FIG. 3 is a detailed view of FIG. 2.

The pulley device 1 further comprises a bearing shield 20 placed between the outer ring 15 of the rolling bearing 8 and the inner bore 7b of the pulley 7. The bearing shield 20, illustrated in details in FIG. 3, comprises an axial portion 20a in contact with the outer surface 15a of the outer ring 15 and with the inner bore 7b of the pulley 7 and extending radially towards the inner ring 14 with a radial portion 20b in contact with the transverse radial surface 15c of the outer ring 15 and the radial surface 11a of the pulley 7. Such a bearing shield 20 forms a housing for the rolling bearing 8. The pulley 7 can be overmoulded on the axial portion 20a of the bearing shield 20. This results in excellent cohesion between these two components. The axial portion 20a of the bearing shield 20 comprises a circumferential rib 20c for a better moulding of the pulley 7. The axial portion 20a of the bearing shield has an axial length bigger than the axial length of the outer ring 15 of the bearing 8, in order to be folded against the outer ring 15 for axially retaining the rolling bearing 8.

The seals 18 and 19 can be force-fitted into slots formed from the bore 15b and near the radial surfaces 15c and 15d of the outer ring 15.

The torque transmitting plate 9, made of a stamped metal sheet, comprises a sleeve tube 9a mounted on the end 4a of the transmission spindle 4 and a radial plate 9b extending radially from the axial sleeve 9a towards the outside and having the general shape of a disc. The sleeve tube 9a and the radial plate 9b form a one-piece component. The sleeve tube 9a may be clamped between the nut 6 possibly supplemented by a washer 6a, and the shoulder 4b of the spindle 4, against which it bears via an axial end surface 9c of the sleeve tube 9a.

Starting from the end of the sleeve tube 9a located axially at the opposite end from the casing 3, the plate 9 extends radially in the overall form of a disc 9b out to an external circumference. The plate diameter may be smaller than the maximum diameter of the pulley 7.

The radial plate 9b of the torque transmission plate 9 comprises a first series of slotted holes 21 made axially through the radial plate 9b. As illustrated on FIG. 1, these slotted holes 21, in the form of four annular portions centred on one and the same circle, are angularly equidistant and tangential to the outer surface of the radial plate 9b. As an alternative, it is possible to have two diametrically opposed slotted holes, or a number of slotted holes smaller or greater than four. It is possible to conceive of different shapes of slotted holes, for example round drillings or trapezoidal drillings. Such slotted holes 21 are drilled through the thickness of the radial plate 9b so as to cooperate with a fitting tool (not illustrated) for axially fitting the rolling bearing 8 and the pulley 7 onto the hollow shaft 25.

The radial plate 9b of the torque transmission plate 9 further comprises a second series of slotted holes 22 made axially through the radial plate 9b. As illustrated on FIG. 1, these slotted holes 22, in the form of four annular portions centred on one and the same circle, are angularly equidistant and located between the first series of slotted holes 21 and the axial sleeve 9a. The second series of slotted holes 22 are uniformly spaced on a circle so that the bridges 22a of the radial plate 9b that remain between the two adjacent slotted holes 22 define a region of lower strength (compared to the rest of the plate) liable to rupture if the transmission torque plate 9 attempts to transmit a torque exceeding a threshold value V, such as 50 N.m.

The pulley device 1 comprises a damping element 23 overmoulded onto the pulley 7 and onto the torque transmission plate 9. The damping element, of the general shape of a disc comprises on its periphery, a series of dovetails 23a adapted to cooperate with recesses 7e of complementary shape on the pulley 7. As illustrated on FIG. 1, the dovetails 23 are of trapezoidal shape; however, it is possible to conceive alternative forms of dovetails cooperating with complementary portions on the pulley 7. Such a damping element 23 allows the vibrations between the pulley 7 and the rotary spindle 4 to be damped. The damping element comprises axial studs 23b extending towards the pulley 7 designed to be axially inserted in the solid annular portion 11 of the pulley 7. The damping element 23 can be of elastomeric material, for example a rubber material or a polyurethane material.

The radial plate 9b comprises through-holes 9d adapted to cooperate with the material of the damping element 23 during a moulding operation.

The pulley device 1 comprising the pulley 7 overmoulded on the bearing shield 20 and the damping element 23, can thus be delivered to a customer, user or assembler of the compressor 2 as a one-piece subassembly.

With the pulley device according to the invention, vibrations from the pulley to the rotary spindle and from the rotary spindle to the pulley are filtered by the damping element, thanks to its circumferential elasticity which can damp the acyclisms of the combustion engine and the vibrations from the rotary spindle.

Furthermore, the shape of the torque transmission plate allows a good overmoulding of the damping material, and has a torque limiter function. The pulley device according to the invention integrates thus two functions, a damping function and a torque limiter function.

The invention claimed is:
1. A pulley device for a rotary machine, the pulley device comprising:
   a pulley;
   a rolling bearing;
   a torque transmission plate having an axial sleeve designed to be mounted on a rotary spindle of the rotary machine; and
   a radial plate extending radially from the axial sleeve and having the general shape of a disc,
   wherein the pulley is mounted on an outer ring of the rolling bearing and on the torque transmission plate, the torque transmission plate being able to transmit a rotational movement from the pulley to the rotary spindle, wherein the pulley device comprises a damping element located between the pulley and the torque transmission plate, wherein the damping element is overmolded onto the pulley and onto the torque transmission plate, and wherein the radial plate comprises through-holes adapted to cooperate with the damping element.

2. The pulley device according to claim 1, wherein the radial plate of the torque transmission plate includes a first series of slotted holes made through the radial plate forming annular portions centered on one and the same circle, angularly equidistant and tangential to a periphery of the radial plate.

3. The pulley device according to claim 2, wherein the radial plate of the torque transmission plate includes a second series of slotted holes made through the radial plate forming annular portions centered on one and the same circle, angularly equidistant and located between the first series of slotted holes and the axial sleeve.

4. The pulley device according to claim 3, wherein the second series of slotted holes are uniformly spaced on a circle so that bridges of the plate that remain between said second series of slotted holes define a region of lower strength liable to rupture if the torque transmission plate transmits a torque exceeding a threshold value.

5. The pulley device according to claim 1, wherein the damping element provides on its periphery, a series of dovetails adapted to cooperate with recesses of complementary shape on the pulley.

6. The pulley device according to claim 1, wherein the damping element is made of elastomeric material.

7. The pulley device according to claim 1, wherein the torque transmission plate is made of a stamped metal sheet.

8. The pulley device according to claim 1 further comprising:
   a bearing shield disposed between the outer ring of the rolling bearing and an inner bore of the pulley.

9. A rotary machine comprising:
   a static hollow shaft;
   a rotary spindle; and
   the pulley device according to claim 1,
   wherein the axial sleeve is mounted on the rotary spindle.

10. The rotary machine according to claim 9, wherein the rotary machine is a compressor.

\* \* \* \* \*